Patented Feb. 18, 1947

2,416,259

UNITED STATES PATENT OFFICE 2,416,259

METHOD FOR MATURING COTTON

John Franklin Kagy and David T. Prendergast, Long Beach, Calif., assignors to The Dow Chemical Company, Midland, Mich., a corporation of Michigan No Drawing. Application June 12, 1944, Serial No. 540,007

5 Claims. (Cl. 47—5)

This invention relates to a method for maturing cotton and is particularly directed to a procedure for treating cotton plants to cause the uniform opening of the bolls and facilitate harvesting.

Cotton is grown throughout the tropical and sub-tropical and in some parts of the south temperate zones. The season of growth, and planting and harvesting practices vary with the particular zone of operation and the conditions of temperature and rainfall peculiar thereto. The culture of long staple cotton as carried out in the southern and south central portions of California is believed representative. Here the cotton is planted early in March and periodically irrigated until about the middle of September. At this time the foliage has attained maximum growth, with the plants approaching or slightly exceeding 6 feet in height and the branches intermeshing so that the average field cannot conveniently be cultivated or worked. At about the middle of September, the bolls on the lower branches are mature and the upper branches have flowers and squares. In most fields the cotton crop is made by the middle of October. The crop is considered made when most of the bolls on the upper branches are mature.

Normally the bolls on the lower branches open first and the opening of the mature bolls on the upper branches takes place over a period of as long as two months from the time when picking of the lower bolls is desirable. This necessitates as many as three pickings in the same field if undesirable weathering of the cotton in early opening bolls is to be avoided and a maximum yield of high grade product obtained.

The lower bolls begin to open about one month after irrigation has been discontinued. At this time, due to lack of water, the plant tends to faver the completion of the development of the bolls rather than further growth of the stem and leaf structure. A frost or other shock to the plant foliage causes the plant to react by forming abscission layers of cells across the petiole bases of the leaves which results in leaf drop. The frosting of the leaves and subsequent formation of abscission layer disrupts the metabolic functions of the plant, and causes the bolls to open rapidly and uniformly.

Since the development of mechanical pickers, it is desirable that the plants be defoliated before harvest. This is also an aid to the free movement through the field of laborers engaged in hand picking. However, this is not essential, and the presence of scattered leaves on the branches does not detract materially from the advantages accruing to harvest operations in a field where all of the bolls have opened uniformly. Various suggestions have been made for burning and defoliating the cotton plants by chemical means. So far as is known, no such method has been completely satisfactory.

In treating cotton to bring about burning of the leaves and/or defoliation, it is not desirable that the plant be quickly killed. This might operate to prevent the final stages of boll development, encourage abscission of the bolls, and render the stems of the plant brittle so that the bolls would be easily broken off during the picking operation.

It is an object of the present invention to provide means for bringing about rapid maturing of the cotton plant after the crop is made, whereby the bolls will open uniformly and permit the harvest of the cotton in a single picking operation. It is a further object of the invention to supply a method whereby the leaves of cotton will be injured to accomplish substantially the result of frosting as far as influencing the early maturity of the plant and uniform opening of the bolls is concerned. An additional object is to supply a method which will accomplish the foregoing without at the same time killing the plant and causing the abscission of boll and stem parts. Other objects will become apparent from the following specification and claims.

We have discovered that the foliage of cotton plants can be treated with pentachlorophenol or its salts to bring about the rapid maturing of the plants, whereby the bolls open uniformly to permit the gathering of the entire crop in a single picking operation. Pentachlorophenol and the pentachlorophenolates, in the proper concentrations, act as phytotoxic substances which weather and burns the leaves and so upset the normal metabolic functions of the plant as to cause at least partial defoliation and rapid development and uniform opening of the bolls. The shock to the foliage approximates that obtained with a light frost and does not immediately kill the cotton plant. This permits a continued limited circulation of the plant juices, whereby the desired boll development is obtained and bolls and boll stems do not tend to abscise or become unduly brittle. This minimizes stem and pericarp contamination of the picked cotton.

The time of application of the phytotoxic substance is critical. Thus, the treatment of cotton during the mid-summer growing season may well result in damage to flowers, squares, and immature bolls so that only a partial crop is obtained. The time of application should be immediately after the crop has been made, by which is meant "at that period when the vegetative growth of the plant has slowed down and the majority of the bolls are fully developed but not yet open." At this time, flowers, squares, and immature bolls would not normally develop to produce mature bolls and injury thereto is of no commercial significance. Also, the mature unopened bolls are resistant to injury and, while the pericarp undergoes some discoloration on contact with the phytotoxic substance, the cotton fiber is not damaged.

The method of the present invention may be carried out with either spray or dust compositions. Suitable dust mixtures include from about 10 to 30 per cent by weight of pentachlorophenol or pentachlorophenolate dispersed in and on a suitable finely-divided carrier, e. g. volcanic ash, bentonite, diatomaceous earth, talc, lignocellulosic flour, and sulfur. The preparation of the dust is conveniently accomplished by simply grinding the carrier and phytotoxic substance together. An alternate procedure includes dissolving the phytotoxic material in a suitable solvent, wetting the carrier with the solution, and evaporating off the solvent.

In the preparation of sprays, from about 5 to about 30 pounds of the pentachlorophenol or pentachlorophenolate per 100 gallons is dispersed in water. When water-soluble phenolates are employed, the spray is in the form of a solution. With pentachlorophenol or a water-insoluble pentachlorophenolate, a suspension of the finely-divided phytotoxic substance is obtained by incorporating wetting or dispersing agents such as sodium lauryl sulfate, caseinates, blood albumen, bentonite, and the like, in the composition. Similarly, wetting agents may be employed with the water-soluble phenolates and solutions thereof.

The dust compositions are generally applied at from 30 to 60 pounds per acre and the sprays at from 20 to 40 gallons per acre. The exact concentration of phytotoxic substance employed in the treating composition and the amount of the latter applied vary with the state of development of the cotton and more particularly with the temperature. Thus, when operating at high temperatures, smaller amounts of phytotoxic material are required than at low temperatures. Similarly when treating less mature stands of cotton or plants of medium development, reduced amounts of the spray or dust mixtures may be employed.

The thickness of the stand determines to a considerable degree the preferred method of application. In general, dusting operations have been found somewhat more satisfactory than spraying. While any suitable means may be employed for applying the dust mixtures, airplane dusting has given the best results when operating on large acreages. However, hand or machine dusters are suitable when the condition of the cotton field permits their use without excessive mechanical injury to the crop.

Where spray compositions are to be used, a fine mist is more satisfactory than a coarse spray. Such mists may be applied either from a plane or with the more conventional tank and boom spray rig.

The invention is illustrated by the treatment of a thick stand of the Alcola variety of long staple cotton. The composition consisted of a 15 per cent by weight dust of pentachlorophenol dispersed on volcanic ash by mechanical mixing methods. This dust product was applied to the cotton by plane at the rate of 50 pounds per acre. Application was made at about the middle of October and one month after irrigation had been suspended. At this time, the plants were about 6 feet in height and a sprinkling of bolls on the lower branches had begun to open. The majority of the bolls on the plants were mature with relatively few flowers, squares, and bolls through the tops of the plants. A few hours after the application of the dust the leaves began to wither. Within two weeks, the majority of the leaves had fallen, and those remaining were dried and shriveled. At this time, practically all of the mature bolls had opened. In a single picking more than 95 per cent of the crop was collected.

In adjacent untreated plots observed as controls, the bolls underwent a progressive opening with little if any defoliation of the plants until early winter. In these fields, three pickings were required in order to obtain a yield of cotton comparable with that harvested from the dusted acreage.

In a similar October application, cotton is sprayed by a tank and boom sprayer with an aqueous solution of 24 pounds of sodium pentachlorophenolate per 100 gallons. The composition is applied as a mist spray at about 30 gallons per acre to obtain a result similar to that shown above for the dusting operation. In this treatment, the few open bolls may be slightly stained by the action of the spray mixture.

Other dust compositions which have been found to give satisfactory results when applied to cotton at dosages of from 25 to 40 pounds per acre include the following:

| | Parts by weight |
|---|---|
| Composition A: | |
| Pentachlorophenol | 20 |
| Volcanic ash | 80 |
| Composition B: | |
| Pentachlorophenol | 20 |
| Finely-ground sulfur | 80 |
| Composition C: | |
| Pentachlorophenol | 15 |
| Finely-ground sulfur | 25 |
| Volcanic ash | 60 |
| Composition D: | |
| Pentachlorophenol | 20 |
| Finely-ground sulfur | 40 |
| Diatomaceous earth | 40 |

Other salts of pentachlorophenol which may be employed substantially as shown above include potassium pentachlorophenolate, calcium pentachlorophenolate, dicyclohexylamine pentachlorophenolate, triethanolamine pentachlorophenolate, ammonium pentachlorophenolate, etc., or any mixture of two or more of these salts or combinations thereof with pentachlorophenol or sodium pentachlorophenolate.

In addition to maturing the cotton at an increased rate and bringing about defoliation and uniform opening of the bolls, the method of treatment as outlined protects the bolls and cotton fibers therein from attack by staining and spore-forming fungus organisms. Also, this treatment is of material aid in controlling boll weevil by cutting down fall population and starving out overwintering larvae through destruction of the leaves required by the latter for food.

While the foregoing discussion and description is directed to both spray and dust compositions, the preferred embodiment of the invention relates to treating cotton with dust mixtures containing pentachlorophenol dispersed in and on finely-divided solid carriers.

We claim:

1. A method for maturing cotton to cause the uniform opening of cotton bolls which includes the step of applying to the foliage of the cotton plant after the crop has been made a phytotoxic substance selected from the group consisting of pentachlorophenol and its salts, the concentration and amount of the latter being such as to exert an herbicidal action on the cotton leaves but not the plant stems.

2. A method for maturing cotton to cause the uniform opening of cotton bolls which includes the step of dusting the foliage of the cotton plant after the crop has been made with a dispersion in a finely-divided inert carrier of from 10 to 30 per cent by weight of pentachlorophenol.

3. A method for maturing cotton to cause the uniform opening of cotton bolls which includes the step of spraying the foliage of the cotton plant after the crop has been made with an aqueous solution of from 5 to 30 pounds of a water-soluble pentachlorophenolate per 100 gallons of spray.

4. A method for maturing cotton to cause the uniform opening of cotton bolls which includes the step of dusting the foliage of the cotton plant after the crop has been made with a dispersion in a finely-divided inert carrier of from 10 to 30 per cent by weight of a phytotoxic substance selected from the group consisting of pentachlorophenol and its salts.

5. A method for maturing cotton to cause the uniform opening of cotton bolls which includes the step of spraying the foliage of the cotton plant after the crop has been made with an aqueous dispersion containing from 5 to 30 pounds of a phytotoxic substance selected from the group consisting of pentachlorophenol and its salts per 100 gallons of spray.

JOHN FRANKLIN KAGY.
DAVID T. PRENDERGAST.

REFERENCES CITED

The following references are of record in the file of this patent:

UNITED STATES PATENTS

| Number | Name | Date |
| --- | --- | --- |
| 1,110,928 | Hall | Sept. 15, 1914 |
| 2,329,680 | Wilkerson | Sept. 14, 1943 |
| 2,188,734 | Carswell | Jan. 30, 1940 |